US011998937B2

(12) United States Patent
Johler et al.

(10) Patent No.: US 11,998,937 B2
(45) Date of Patent: Jun. 4, 2024

(54) HEIGHT-ADJUSTABLE MASKING PALLET ASSEMBLY FOR ARC SPRAY APPLICATIONS

(71) Applicant: Dongguan Littelfuse Electronics Company Limited, Dongguan (CN)

(72) Inventors: Werner Johler, Shanghai (CN); Dongjian Song, Dongguan (CN); Libing Lu, Dongguan (CN)

(73) Assignee: Dongguan Littelfuse Electronics Company Limited, Dongguan (CN)

( * ) Notice: Subject to any disclaimer, the term of this patent is extended or adjusted under 35 U.S.C. 154(b) by 0 days.

(21) Appl. No.: 17/858,480

(22) Filed: Jul. 6, 2022

(65) Prior Publication Data

US 2023/0010623 A1 Jan. 12, 2023

(30) Foreign Application Priority Data

Jul. 9, 2021 (CN) ......................... 202110777956.2

(51) Int. Cl.
*B05B 12/20* (2018.01)
*B05B 13/02* (2006.01)

(52) U.S. Cl.
CPC .......... *B05B 12/29* (2018.02); *B05B 13/0292* (2013.01)

(58) Field of Classification Search
None
See application file for complete search history.

(56) References Cited

U.S. PATENT DOCUMENTS

| | | | | |
|---|---|---|---|---|
| 10,987,694 | B2 * | 4/2021 | Wei | B05C 13/02 |
| 10,989,841 | B2 * | 4/2021 | Wei | C23C 14/50 |
| 2008/0290476 | A1 * | 11/2008 | McColloch | H01L 21/561 438/109 |
| 2020/0047214 | A1 * | 2/2020 | Wei | G02B 3/0075 |
| 2020/0049859 | A1 * | 2/2020 | Wei | C23C 14/50 |
| 2020/0049860 | A1 * | 2/2020 | Wei | C23C 16/458 |

FOREIGN PATENT DOCUMENTS

CN 207208782 U 4/2018

* cited by examiner

*Primary Examiner* — Jethro M. Pence
(74) *Attorney, Agent, or Firm* — KDW Firm PLLC

(57) ABSTRACT

Disclosed are various pallet assemblies for arc spray applications. In some embodiments, an assembly may include a top frame comprising a plurality of recesses each operable to receive an electronic device, and a bottom frame coupled to the top frame, wherein the bottom frame comprises a plurality of support structures, and wherein each support structure of the plurality of support structures is aligned with a corresponding recess of the plurality of recesses. The assembly may further include a mechanical device coupled to the top frame and the bottom frame, wherein the mechanical device is operable to bias the top frame and the bottom frame relative to one another.

7 Claims, 11 Drawing Sheets

HEIGHT-ADJUSTABLE MASKING PALLET ASSEMBLY FOR ARC SPRAY APPLICATIONS

FIELD OF THE DISCLOSURE

The present disclosure is generally related to the field of circuit protection devices. More particularly, embodiments of the present disclosure relate to a height-adjustable masking pallet assembly for arc spray applications.

BACKGROUND OF THE DISCLOSURE

Typically, masking pallets for electronic devices, such as metal-oxide varistors (MOVs), are made of a solid metal, e.g., aluminum or steel. During an arc spray process, each MOV may be placed into a positioning hole of a carrier pallet. An ultra-high temperature and ultra-high velocity deposition of metal particles may then be applied to act as an electrode for each MOV. A second electrode may be sprayed onto the MOV at a different location, such as on the opposite side, with the electrode positions being based on the shape of the MOV core. However, to avoid flashover during surge testing, an outer edge area of the MOV surface (e.g., “free zone”) should not be covered by the metal particles. In some approaches, each MOV is first covered with a paper mask to prevent contamination of the free zone.

During manufacturing, it is common to have ten or more different voltage ratings for a same diameter MOV, for example. A variety of chip disk thicknesses may also be desired, which requires different hole depths for the carrier pallet if the pallet height is fixed. Due to these variations, manufacturing MOVs using current carrier pallets is labor intensive and costly.

There is a need, therefore, for an improved masking pallet assembly for arc spray applications.

SUMMARY OF THE DISCLOSURE

The Summary is provided to introduce a selection of concepts in a simplified form, the concepts further described below in the Detailed Description. The Summary is not intended to identify key features or essential features of the claimed subject matter, nor is the Summary intended as an aid in determining the scope of the claimed subject matter.

In one approach, an assembly may include a top frame comprising a plurality of recesses each operable to receive an electronic device, and a bottom frame coupled to the top frame, wherein the bottom frame comprises a plurality of support structures, and wherein each support structure of the plurality of support structures is aligned with a corresponding recess of the plurality of recesses. The assembly may further include a mechanical device coupled to the top frame and the bottom frame, wherein the mechanical device is operable to bias the top frame and the bottom frame relative to one another.

In another approach, a pallet assembly may include a top frame comprising a plurality of recesses each operable to receive an electronic device, and a bottom frame coupled to the top frame, wherein the bottom frame comprises a plurality of support structures, and wherein each support structure of the plurality of support structures is aligned with a corresponding recess of the plurality of recesses. The pallet assembly may further include a mechanical device coupled to the top frame and to the bottom frame, wherein the mechanical device is operable to increase and decrease a distance between the top frame and the bottom frame.

In yet another approach, a pallet assembly may include a top frame comprising a plurality of recesses each operable to receive an electronic device, and a bottom frame coupled to the top frame, wherein the bottom frame comprises a plurality of support structures, and wherein each support structure of the plurality of support structures is aligned with a corresponding recess of the plurality of recesses. The pallet assembly may further include a mechanical device coupled to the top frame and to the bottom frame, wherein the mechanical device is operable to increase and decrease a distance between the top frame and the bottom frame.

BRIEF DESCRIPTION OF THE DRAWINGS

The accompanying drawings illustrate exemplary approaches of the disclosed embodiments so far devised for the practical application of the principles thereof, and wherein.

Figure 1A:
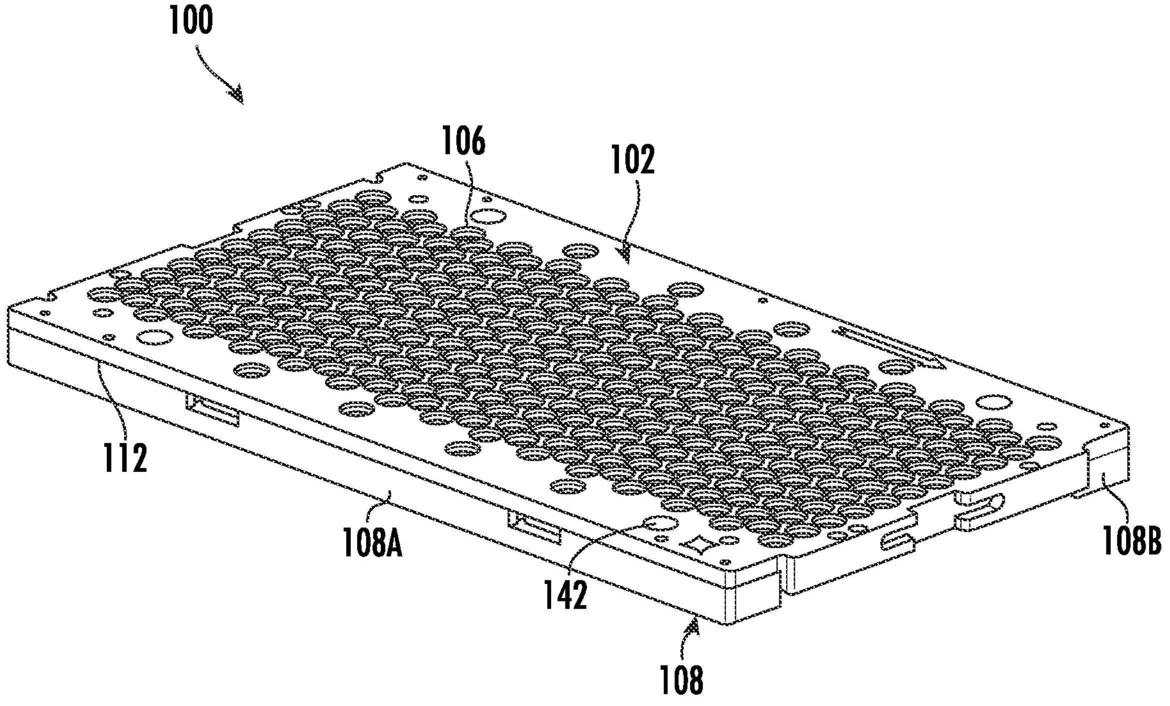
FIG. 1A depicts a top perspective view of an assembly according to embodiments of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of “slices”, or “near-sighted” cross-sectional views, omitting certain background lines otherwise visible in a “true” cross-sectional view, for illustrative clarity. Furthermore, for clarity, some reference numbers may be omitted in certain drawings.

DETAILED DESCRIPTION

Assemblies, devices, systems, and methods in accordance with the present disclosure will now be described more fully hereinafter with reference to the accompanying drawings, where embodiments are shown. The assemblies, devices, systems, and methods may be embodied in many different forms and are not to be construed as being limited to the embodiments set forth herein. Instead, these embodiments are provided so the disclosure will be thorough and complete, and will fully convey the scope of the disclosure to those skilled in the art.

As will be described in greater detail herein, embodiments of the present disclosure provide a novel height-adjustable carrier pallet assembly, which can address the above identified problems of the prior art. Embodiments of the present disclosure allow the use of one pallet to meet different disk thicknesses for a same diameter MOV. Furthermore, the carrier pallet assembly of the present disclosure allows for a variety of different hole depths to generate MOVs with varying thickness. As a result, each MOV can be generally planar with a top surface of the carrier pallet assembly, and manufacturing accuracy can be increased.

Figure 1B:
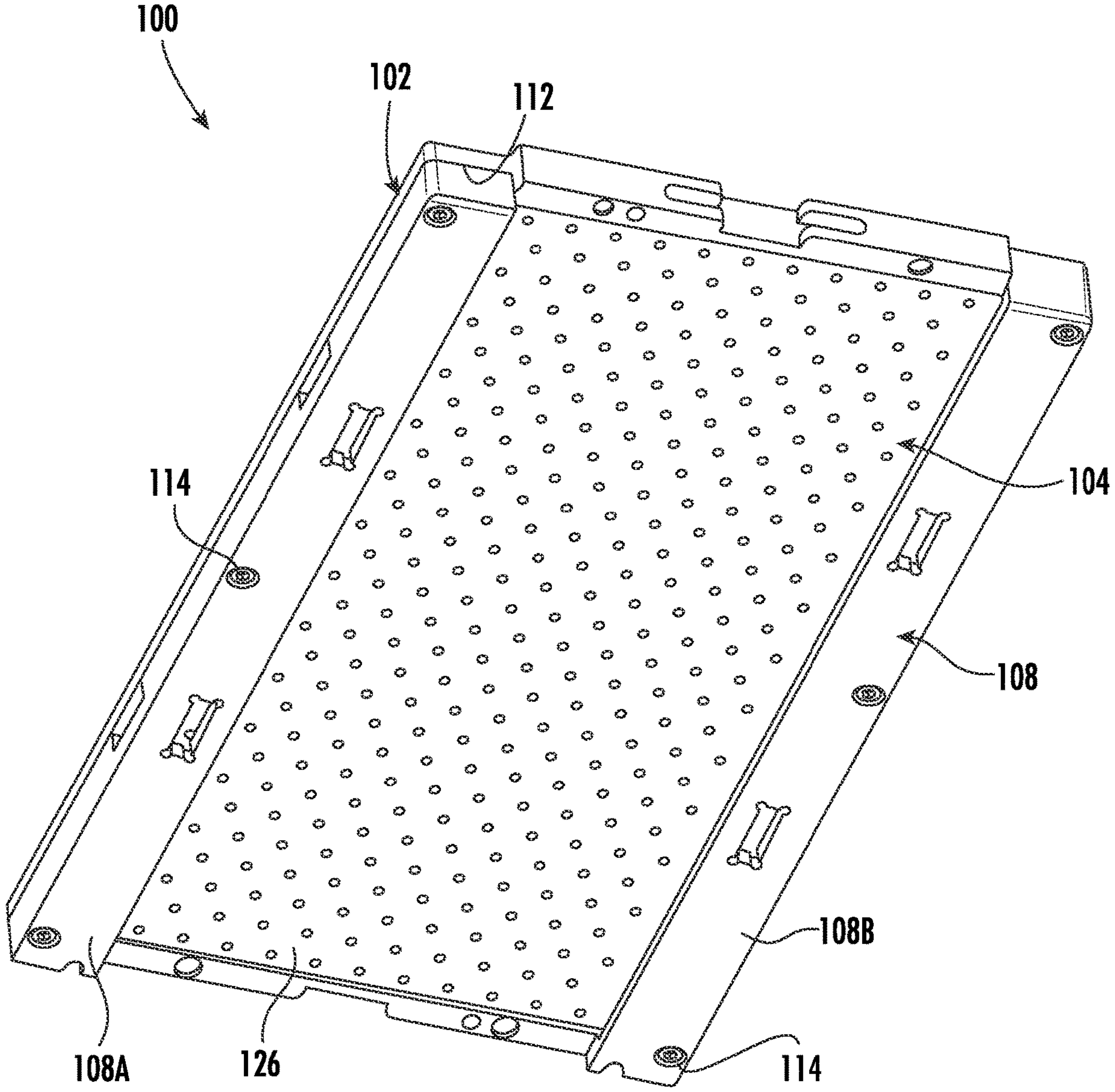
FIG. 1B depicts a bottom perspective view of the assembly according to embodiments of the present disclosure.
Figure 1C:
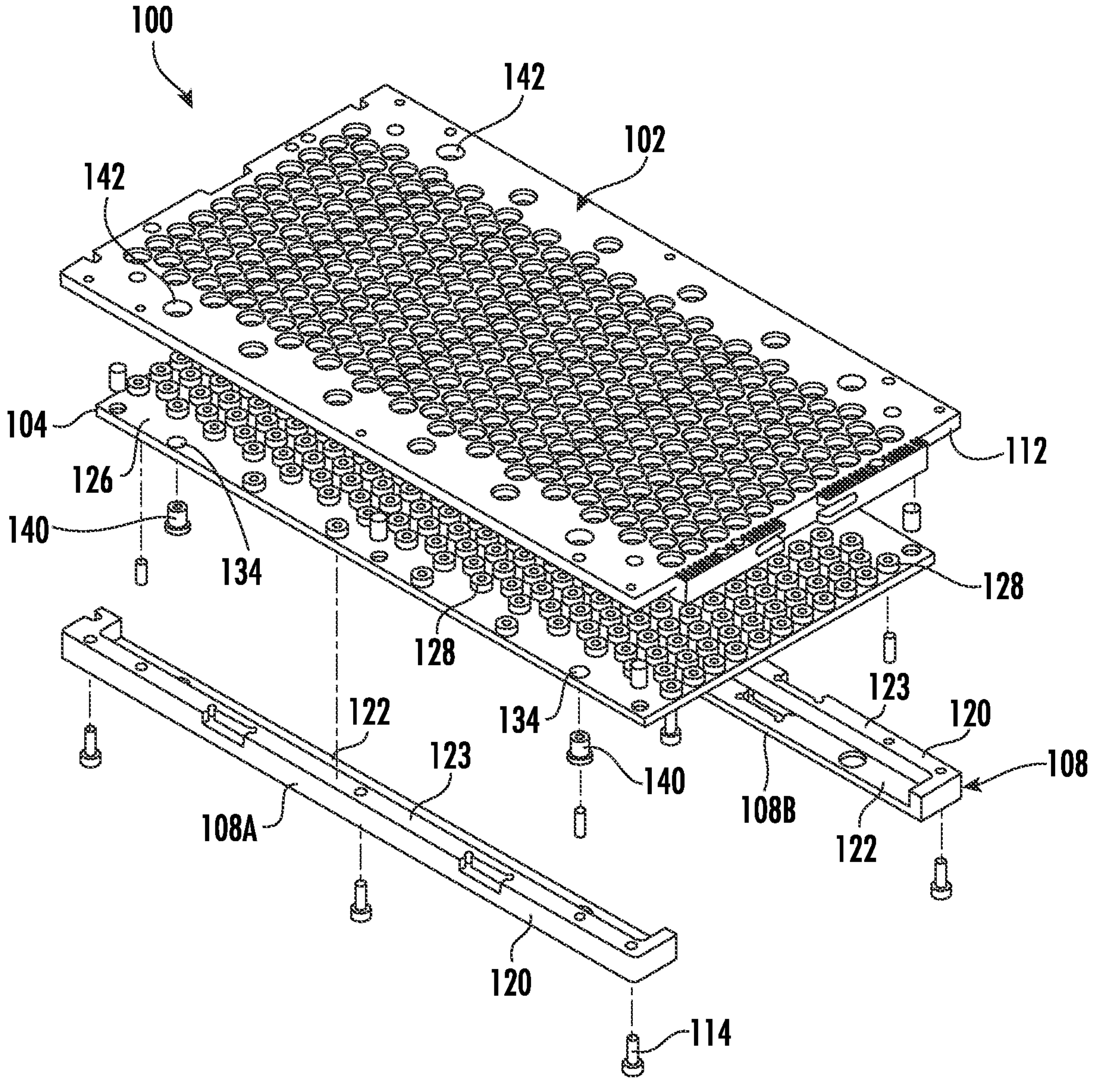
FIG. 1C depicts an exploded perspective view of the assembly according to embodiments of the present disclosure.

Turning to FIGS. 1A-1C, a pallet assembly (hereinafter "assembly") 100 will be described. As shown, the assembly 100 may include a top frame 102 coupled together with a bottom frame 104. The top frame 102 may include a central interior area including a plurality of recesses 106 each operable to receive an electronic device, which may be one or more MOV disks. Although non-limiting, the top frame 102 and/or the bottom frame 104 may be made from a metal or other material with a high mechanical strength (e.g., metal alloy, steel, stainless steel, aluminum, aluminum alloy, etc.) to prevent deformation of the assembly 100.

In some embodiments, the top frame 102 may be coupled to the bottom frame 104 by a side frame 108. As shown, the side frame 108 may include a first frame member 108A opposite a second frame member 108B. The first and second frame members 108A-108B may generally extend along opposite sides of the top and bottom frames 102, 104. The side frame 108 may be directly coupled to an underside 112 of the top frame 102, for example, by one or more fasteners 114. As best shown in FIG. 1C, each of the first and second frame members 108A, 108B may include an outer wall 120 connected to an interior shelf 122, wherein the top frame 102 may be positioned atop an upper surface 123 of the outer wall 120, and wherein the bottom frame 104 may be positioned atop the interior shelf 122.

The bottom frame 104 may include a base plate 126 and a plurality of support structures 128 extending from the base plate 126, as best shown in FIG. 1C. Each of the support structures 128 may be aligned beneath a corresponding recess 106 of the top frame 102. It will be appreciated that a greater or fewer number of support structures 128 may be present along the base plate 126 in alternative embodiments. As shown, the base plate 126 may include one or more openings 134 operable to receive a mechanical device 140, which may be a screw in some embodiments. Each of the mechanical devices 140 may further extend through corresponding screw openings 142 of the top frame 102.

Figure 2A:
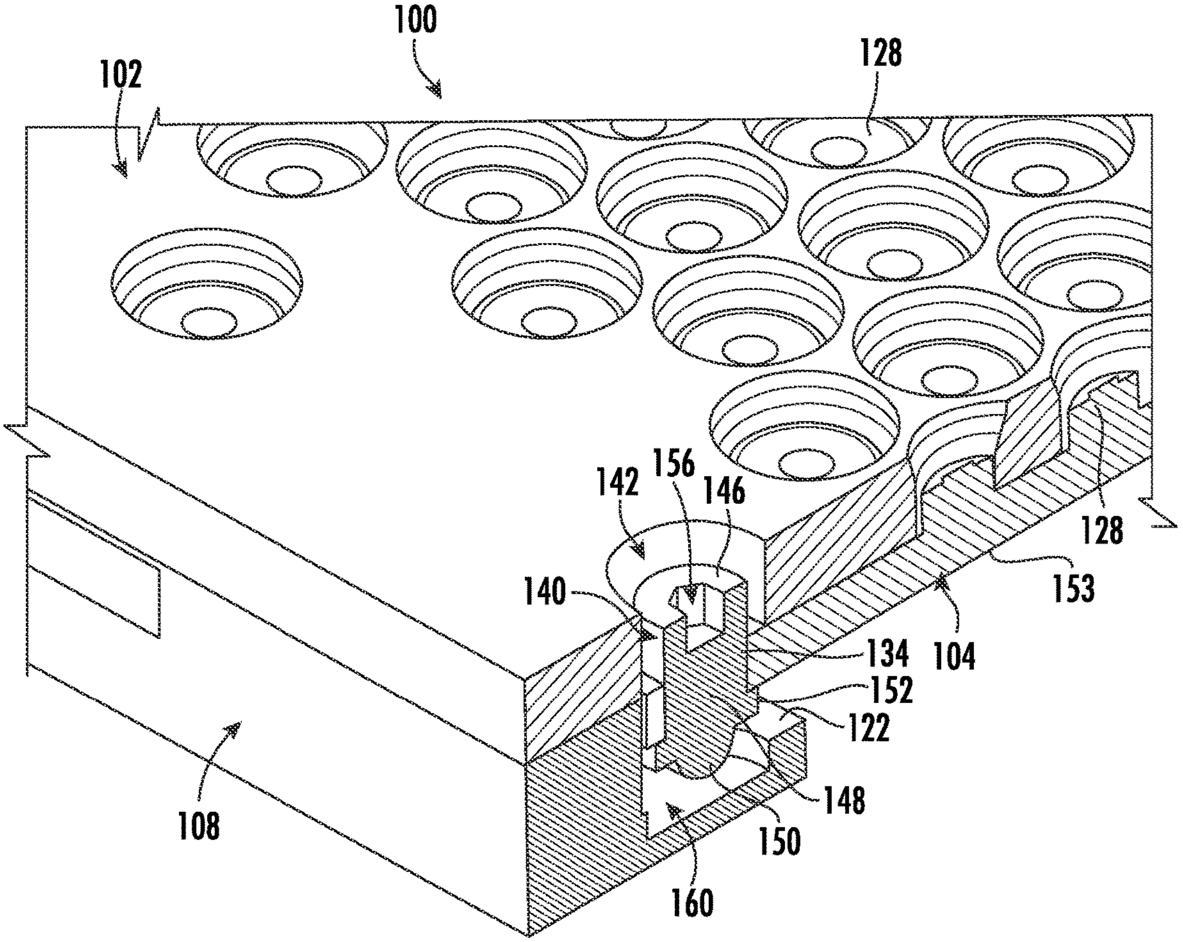
FIGS. 2A-2B are cutaway views showing a mechanical device of the assembly according to embodiments of the present disclosure.
Figure 2B:
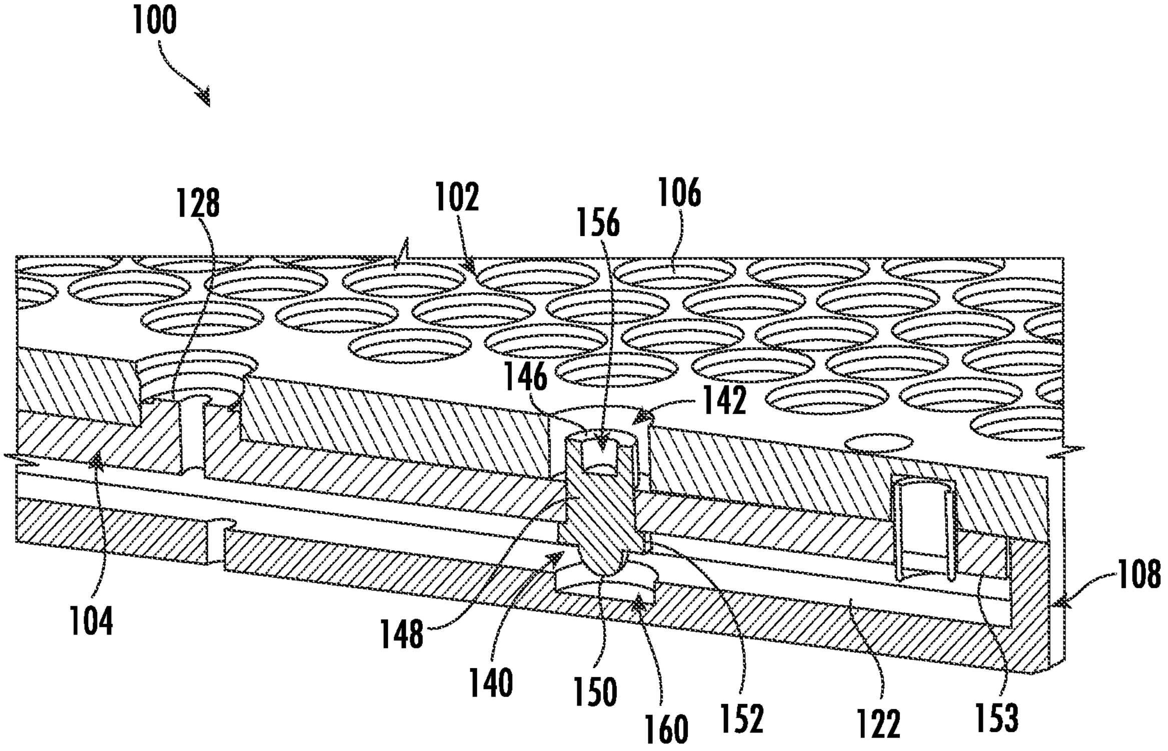

FIGS. 2A-2B demonstrate the mechanical device 140 in greater detail. In some embodiments, the mechanical device 140 may be a screw including a first end 146 extending into the screw opening 142 of the top frame 102, a central section 148 engaged with the bottom frame 104, and a second end 150 engaged with an interior surface of the side frame 108. In some embodiments, a flange 152 may separate the central section 148 from the second end 150. Furthermore, the flange 152 may be in contact with an underside 153 of the bottom frame 104. In some embodiments, the second end 150 may extend into and/or be in direct physical contact with a recess 160 provided in the interior shelf 122 of the side frame 108.

During use, the screw opening 142 of the top frame 102 may provide access to the mechanical device 140 to enable adjustment thereof. In some embodiments, a tool (not shown) may be inserted into a tool opening 156 of the first end 146 of the mechanical device 140 to rotate the mechanical device 140. The opening 134 of the bottom frame 104 may include internal threading (not shown) engaged with external threading (not shown) of the central section 148. As the mechanical device 140 rotates, the mechanical device 140 causes the bottom frame 104 to move closer or farther from the first frame 102 to adjust a depth of one or more of the recesses 106 of the top frame 102.

Figure 3A:
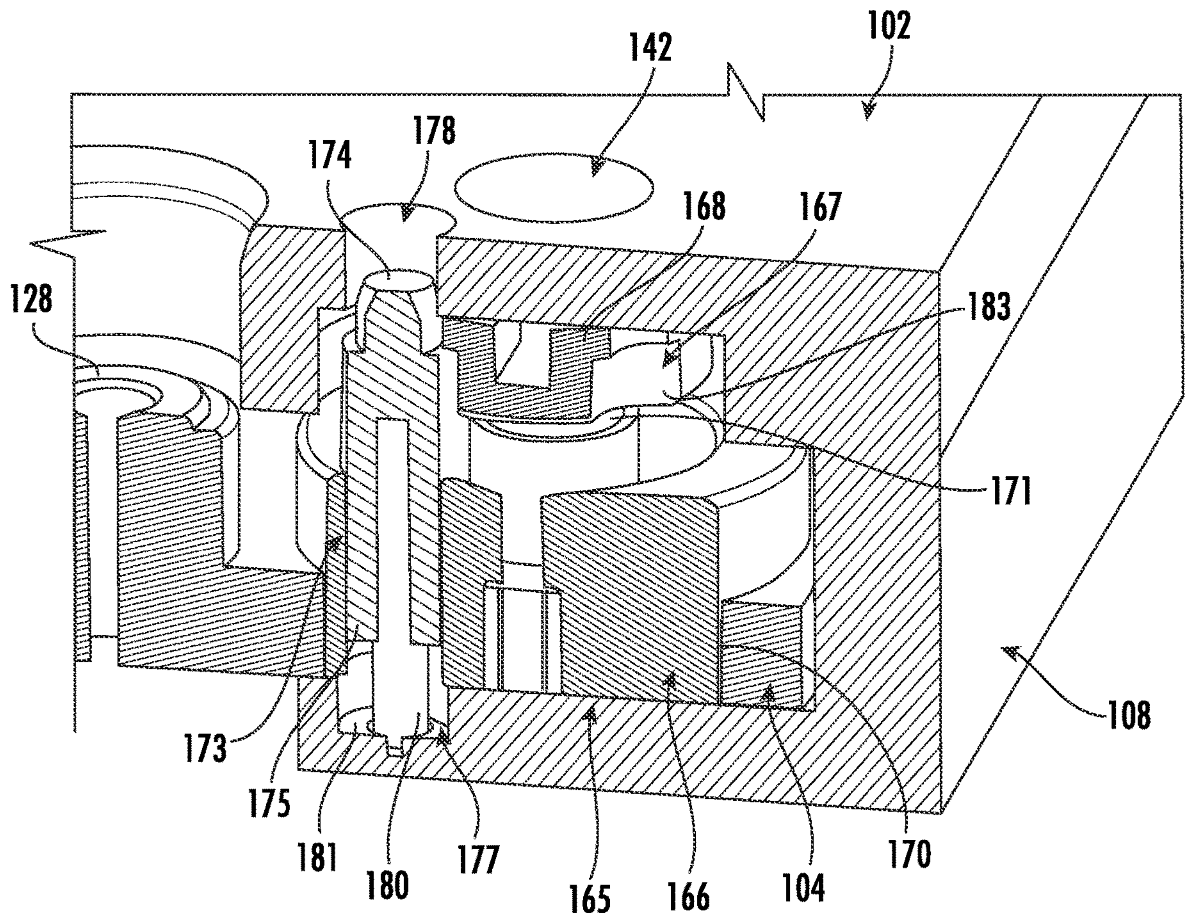
FIGS. 3A-3B are cutaway views showing a mechanical device of an assembly according to embodiments of the present disclosure.
Figure 3B:
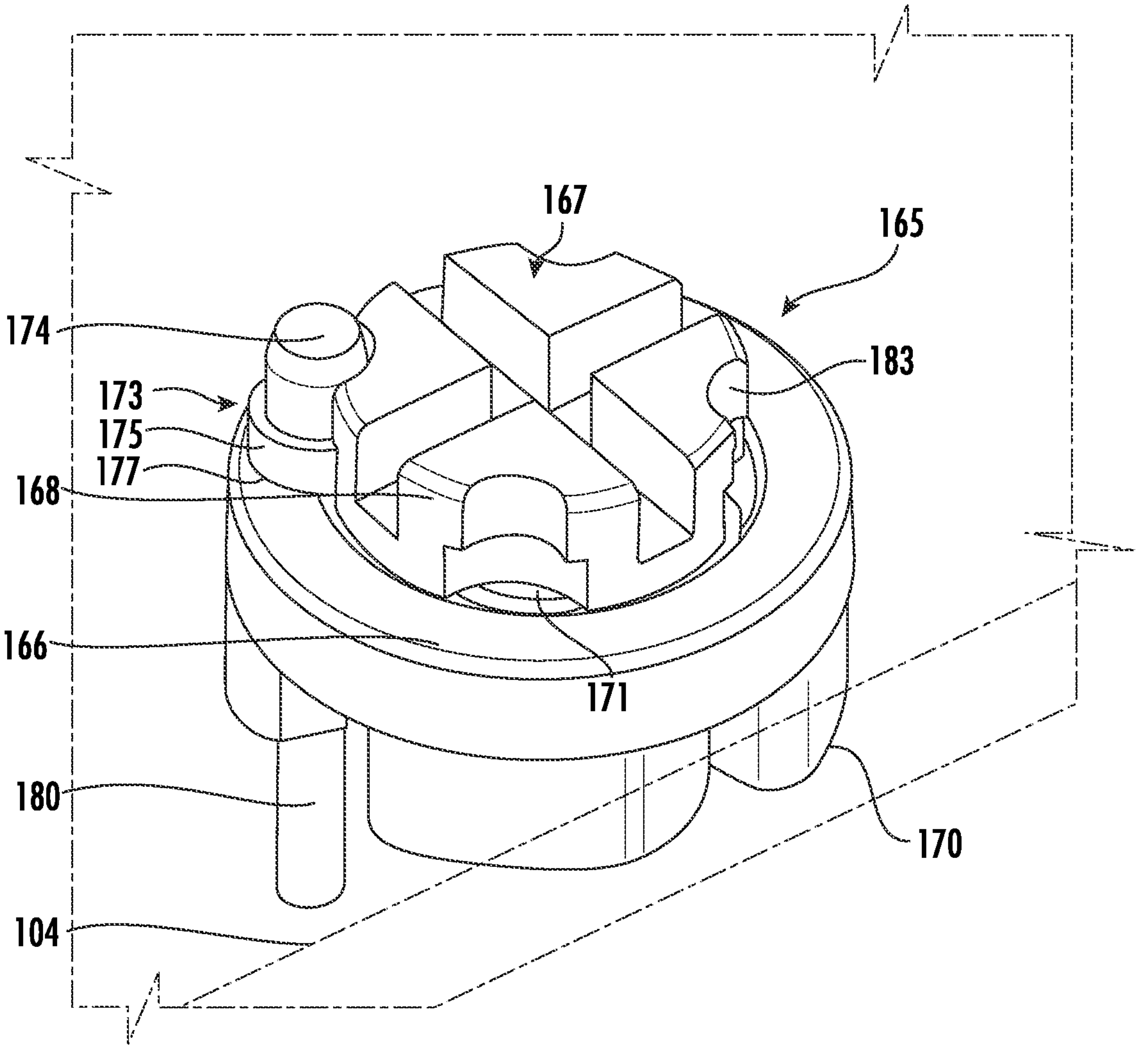

FIGS. 3A-3B show another mechanical device 165 according to embodiments of the present disclosure. In some embodiments, the mechanical device 165 may be a screw assembly including an adjustment block 166 coupled to the bottom frame 104 and a screw 167 coupled with the adjustment block 166. The adjustment block 166 may extend into a recess or opening 170 of the bottom frame 104. The screw 167 may include a head 168 positioned within or beneath the screw opening 142 of the top frame 102 for engagement by a tool (not shown) to rotate the screw 167. A body 171 of the screw 167 may extend within a central screw cavity of the adjustment block 166. Although not shown, the body 171 may include exterior threading engaged with interior threading of the central screw cavity.

As further shown, the mechanical device 165 may include a stop pin 173 engaged with the head 168 of the screw 167 and the adjustment block 166. More specifically, the stop pin 173 may include an engagement head 174 extending from a main body 175, wherein the engagement head 174 is engageable with one or more indentations or notches 183 of the head 168 to prevent rotation of the screw 167 relative to the adjustment block 166. As shown, the main body 175 of the stop pin 173 may extend through a pin opening 177 of the adjustment block 166. The engagement head 174 may be accessible through a pin opening 178 of the top frame 102, as shown in FIG. 3A.

During use, the engagement head 174 may be depressed through the pin opening 178, which causes the main body 175 to depress a spring 180 extending through a central spring cavity of the main body 175 of the stop pin 173. In some embodiments, the spring 180 may be in direct contact with a spring opening surface 181 of the side frame 108. Once the stop pin 173 has been disengaged, the screw 167 may be accessed through the screw opening 142 of the top frame 102 to enable rotation thereof. As the screw 167 rotates, the screw 167 and the adjustment block 166 move relative to one another, which causes the bottom frame 104 and the top frame 102 to be biased relative to one another. Once a desired distance between the top frame 102 and the bottom frame 104 has been achieved, the stop pin 173 may once again be engaged to return the engagement head 174 against the notch 183 of the head 168 to prevent further rotation of the screw 167.

Figure 4A:
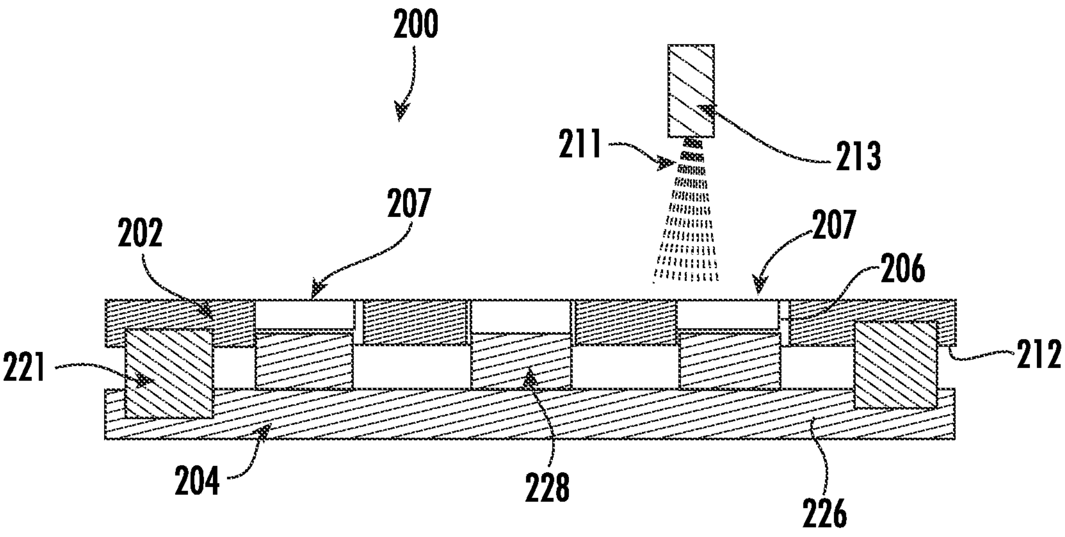
FIGS. 4A-4B are side views showing a mechanical device of an assembly according to embodiments of the present disclosure.
Figure 4B:
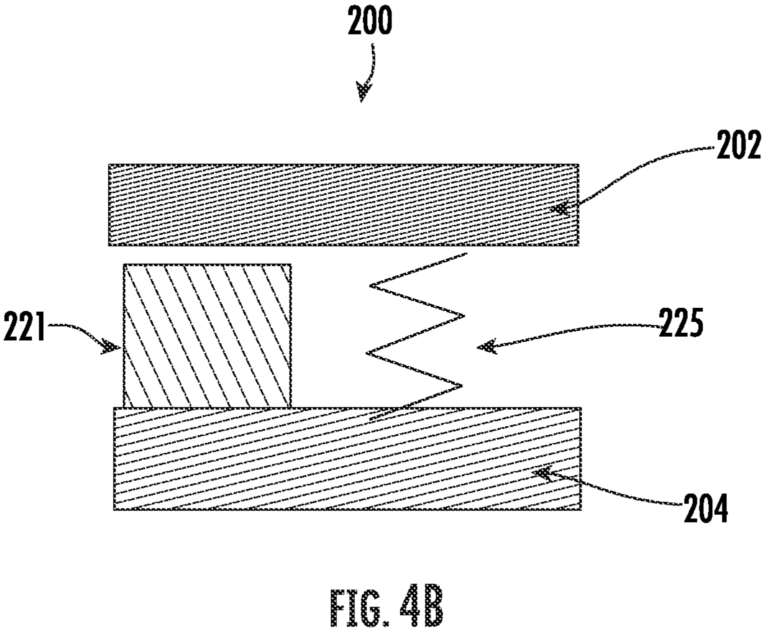

FIGS. 4A-4B demonstrate another assembly 200 according to embodiments of the present disclosure. As shown, the assembly 200 may include a top frame 202 coupled together with a bottom frame 204. The top frame 202 may include a central interior area including a plurality of recesses 206 each operable to receive an electronic device 207, which may be one or more MOV disks. Although non-limiting, the top frame 202 and/or the bottom frame 204 may be made from a metal or other material with a high mechanical strength (e.g., metal alloy, steel, stainless steel, aluminum, aluminum alloy etc.) to prevent deformation of the assembly 200.

In some embodiments, the top frame 202 may be coupled to the bottom frame 204 by a side frame (not shown). As described above, the side frame may include a first frame member opposite a second frame member. The first and second frame members may generally extend along opposite sides of the top and bottom frames 202, 204. The side frame may be directly coupled to an underside 212 of the top frame 202, for example, by one or more fasteners.

The bottom frame 204 may include a base plate 226 and a plurality of support structures 228 extending from the base plate 226. Each of the support structures 228 may be aligned beneath a corresponding recess 206 of the top frame 202. It will be appreciated that a greater or fewer number of support structures 228 may be present along the base plate 226 in alternative embodiments. During processing, each of the electronic devices 207 may be processed by an arc spray coating process in which metal particles 211 are delivered by a spray gun 213 to an upper surface of the electronic devices 207.

The assembly 200 may further include a mechanical device, such as a wedge or spacing block 221, which maintains a distance between the top frame 202 and the bottom frame 204. As shown in FIG. 4B, the assembly 200 may include a spring 225, which is coupled to the top frame 202 and the bottom frame 204. In some embodiments, the spring 225 may be held in tension to draw the top and bottom frames 202, 204 together. When the spacing block 221 is in place, a relative position of the top and bottom frames 202, 204 is maintained. It will be appreciated that differently sized spacing blocks 221 may be used across the assembly 200 to vary a height of the top frame 202.

Figure 5A:
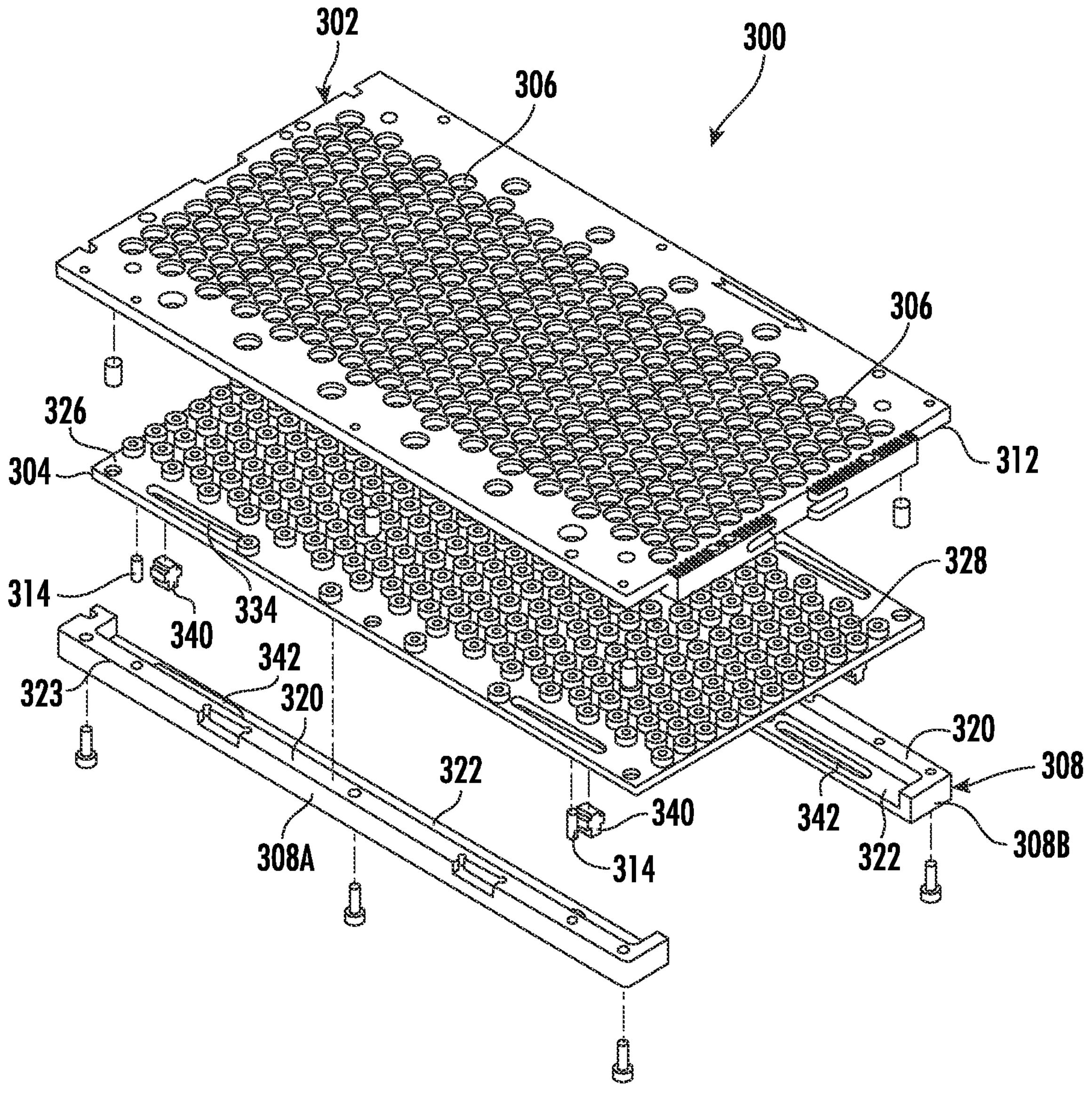
FIG. 5A is an exploded perspective view of an assembly according to embodiments of the present disclosure.
Figure 5B:
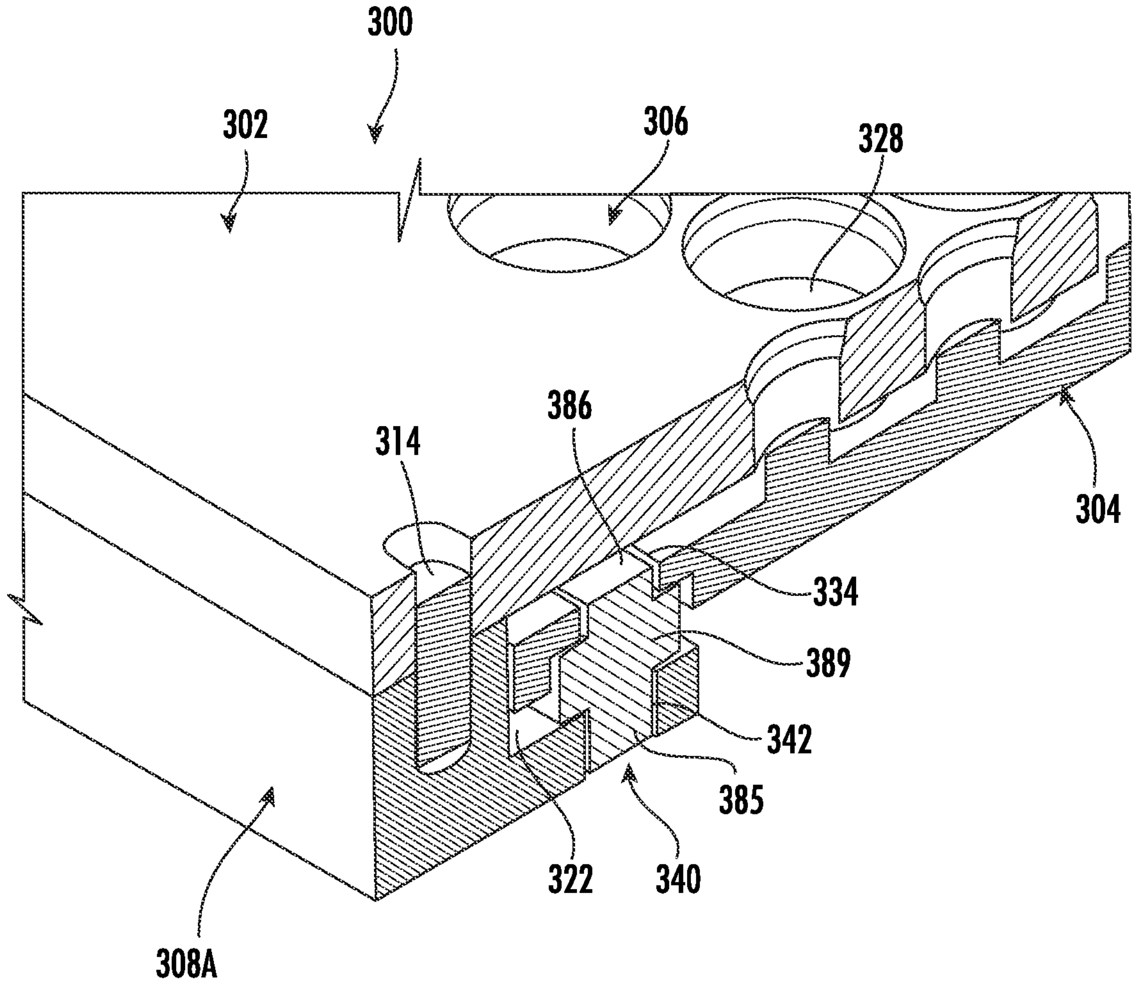
FIGS. 5B-5C are cutaway views showing a mechanical device of the assembly of FIG. 5A according to embodiments of the present disclosure.
Figure 5C:
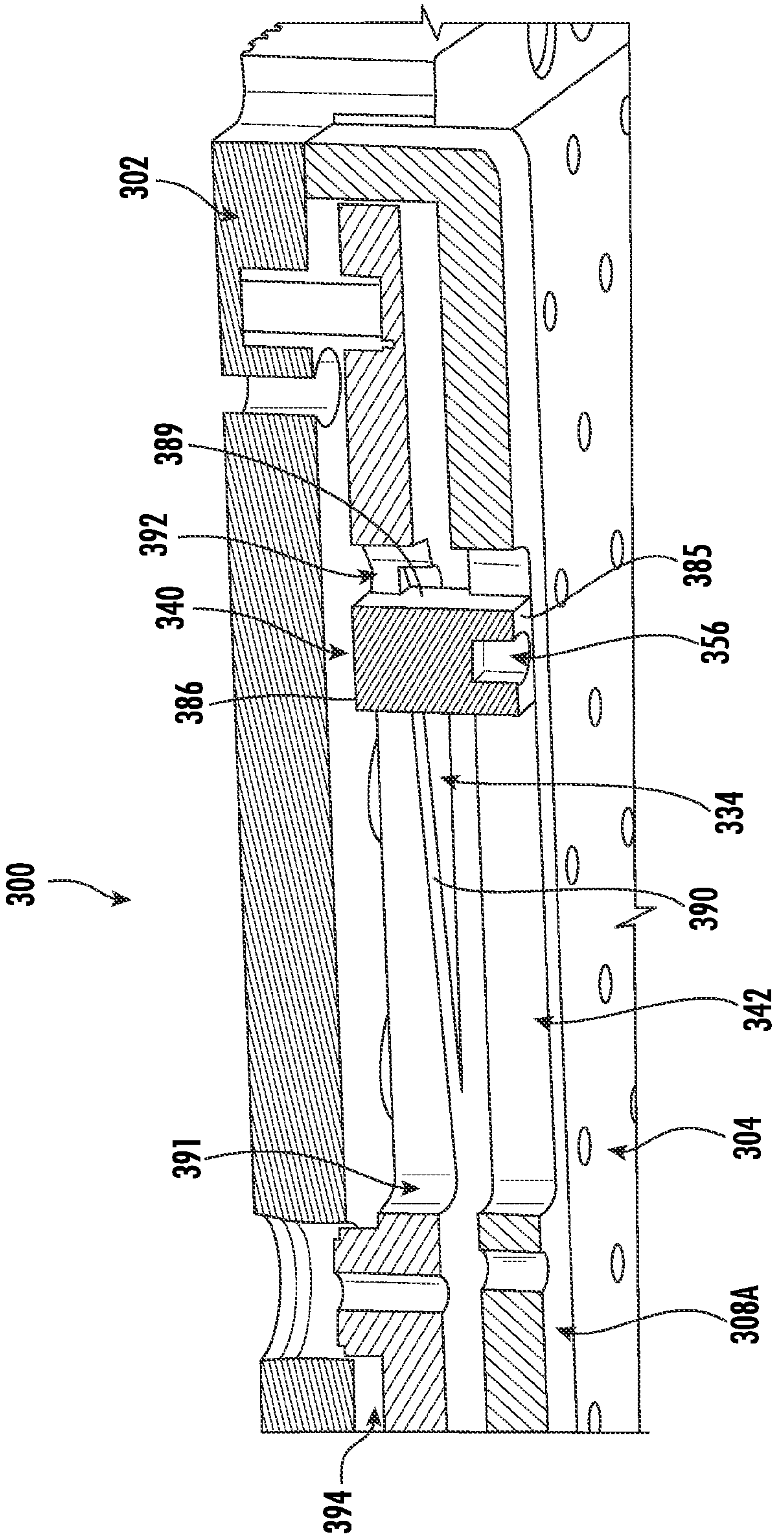

Turning to FIGS. 5A-5C, a pallet assembly (hereinafter "assembly") 300 will be described. As shown, the assembly 300 may include a top frame 302 coupled together with a bottom frame 304. The top frame 302 may include a central interior area including a plurality of recesses 306 each operable to receive an electronic device, which may be one or more MOV disks. Although non-limiting, the top frame 302 and/or the bottom frame 304 may be made from a metal or other material with a high mechanical strength (e.g., metal alloy, steel, stainless steel, aluminum, aluminum alloy etc.) to prevent deformation of the assembly 300.

In some embodiments, the top frame 302 may be coupled to the bottom frame 304 by a side frame 308. As shown, the side frame 308 may include a first frame member 308A opposite a second frame member 308B. The first and second frame members 308A-308B may generally extend along opposite sides of the top and bottom frames 302, 304. The side frame 308 may be directly coupled to an underside 312 of the top frame 302, for example, by one or more fasteners 314. As best shown in FIG. 5A, each of the side frame members 308A, 308B may include an outer wall 320 connected to an interior shelf 322, wherein the top frame 302 may be positioned atop an upper surface 323 of the outer wall 320, and wherein the bottom frame 304 may be positioned atop the interior shelf 322.

The bottom frame 304 may include a base plate 326 and a plurality of support structures 328 extending from the base plate 326. Each of the support structures 328 may be aligned beneath a corresponding recess 306 of the top frame 302. It will be appreciated that a greater or fewer number of support structures 328 may be present along the base plate 326 in alternative embodiments. As shown, the base plate 326 may include one or more openings 334 operable to receive a mechanical device, which may be a slider 340 in some embodiments. The slider 340 may further extend through corresponding slider tracks 342 of the first and second frame members 308A, 308B.

FIGS. 5B-5C demonstrate the slider 340 in greater detail. In some embodiments, the slider 340 may include a lower section 385 extending into the slider track 342 of the first frame member 308A, an upper section 386 extending through the opening 334 of the bottom frame 304, and a central section 389 in contact with the interior shelf 322 of the first frame member 308A. Although non-limiting, the slider 340 may have a cross-shape profile. As best shown in FIG. 5C, the opening 334 of the base plate 326 of the bottom frame 304 may include a sloped surface 390 along an underside thereof. That is, the sloped surface 390 may generally face the slider track 342, and the central section 389 of the slider 340 may be engaged with the sloped surface 390.

During use, the slider track 342 of the first frame member 308A may provide access to the slider 340 to enable adjustment thereof by a tool (not shown), which may be inserted into a tool opening 356 of the lower section 385 of the slider 340. As the slider 340 is biased between a first end 391 and a second end 392 of the opening 334, the central section 389 of the slider 340 is forced against the sloped surface 390, which raises or lowers the bottom frame 304 relative to the top frame 302. Because the top frame 302 is fixed to the first frame member 308A, the bottom frame 304 may be moved within a gap 394 between the top and bottom frames 302, 304.

As used herein, an element or step recited in the singular and proceeded with the word "a" or "an" is understood as not excluding plural elements or steps, unless such exclusion is explicitly recited. Furthermore, references to "one embodiment" of the present disclosure are not intended to be interpreted as excluding the existence of additional embodiments also incorporating the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions and are both conjunctive and disjunctive in operation. For example, expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are just used for identification purposes to aid the reader's understanding of the present disclosure. The directional references do not create limitations, particularly as to the position, orientation, or use of the disclosure. Connection references (e.g., attached, coupled, connected, and joined) are to be construed broadly and may include intermediate members between a collection of elements and relative movement between elements unless otherwise indicated. As such, connection references do not necessarily infer two elements are directly connected and in fixed relation to each other.

Furthermore, identification references (e.g., primary, secondary, first, second, third, fourth, etc.) are not intended to connote importance or priority, and are used to distinguish one feature from another. The drawings are for purposes of illustration, and the dimensions, positions, order and relative sizes reflected in the drawings attached hereto may vary.

Furthermore, the terms "substantial" or "approximately," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function.

Although non-limiting, the deviation from the reference parameter can be, for example, in an amount of less than 1%, less than 3%, less than 5%, less than 10%, less than 15%, less than 20%, and so on.

While certain embodiments of the disclosure have been described herein, the disclosure is not limited thereto, as the disclosure is as broad in scope as the art will allow and the specification may be read likewise. Therefore, the above description is not to be construed as limiting. Instead, the above description is merely as exemplifications of particular embodiments. Those skilled in the art will envision other modifications within the scope and spirit of the claims appended hereto.

What is claimed is:

1. An assembly, comprising:

a top frame comprising a plurality of recesses each operable to receive an electronic device;

a bottom frame coupled to the top frame, wherein the bottom frame comprises a plurality of support structures, and wherein each support structure of the plurality of support structures is aligned with a corresponding recess of the plurality of recesses; and a screw assembly comprising:

an adjustment block coupled to the bottom frame; and a screw coupled with the adjustment block, wherein the screw extends through a screw opening of the top frame, and wherein rotation of the screw causes the bottom frame and the top frame to move relative to one another.

2. The assembly of claim 1, further comprising a side frame coupled to the top frame and the bottom frame.

3. The assembly of claim 2, wherein the side frame comprises a first frame member and a second frame member, and wherein the screw assembly is in direct physical contact with the first frame member or the second frame member.

4. The assembly of claim 1, wherein the screw assembly further comprises a stop pin operable to engage the screw to prevent rotation of the screw relative to the adjustment block.

5. The assembly of claim 4, wherein the stop pin comprises a spring in contact with the stop pin, and wherein the spring is in direct physical contact with the side frame.

6. The assembly of claim 4, wherein the screw comprises one or more notches operable to receive the stop pin, and wherein the stop pin extends into a pin opening of the top frame.

7. The assembly of claim 1, wherein the bottom frame comprises a base plate, and wherein each of the plurality of support structures extends from an upper surface of the base plate.

* * * * *